US012782314B2

(12) United States Patent
Onishi et al.

(10) Patent No.: US 12,782,314 B2

(45) **Date of Patent: *Nov. 3, 2026**

(54) SENSOR ELEMENT OF GAS SENSOR

(71) Applicant: NGK INSULATORS, LTD., Nagoya (JP)

(72) Inventors: Ryo Onishi, Iwakura (JP); Yusuke Watanabe, Nagoya (JP); Yasuhide Kojima, Nagoya (JP); Takashi Hino, Kasugai (JP)

(73) Assignee: NGK INSULATORS, LTD., Nagoya (JP)

( * ) Notice: Subject to any disclaimer, the term of this patent is extended or adjusted under 35 U.S.C. 154(b) by 493 days.

This patent is subject to a terminal disclaimer.

(21) Appl. No.: 17/460,770

(22) Filed: Aug. 30, 2021

(65) Prior Publication Data

US 2021/0389270 A1 Dec. 16, 2021

Related U.S. Application Data

(63) Continuation of application No. PCT/JP2020/009578, filed on Mar. 6, 2020.

(30) Foreign Application Priority Data

Mar. 29, 2019 (JP) ................................ 2019-067010

(51) Int. Cl.
*G01N 27/407* (2006.01)
*G01N 27/41* (2006.01)

(52) U.S. Cl.
CPC ..... *G01N 27/4077* (2013.01); *G01N 27/4071* (2013.01); *G01N 27/41* (2013.01)

(58) Field of Classification Search
CPC ........... G01N 27/4077; G01N 27/4071; G01N 27/419; G01N 27/406–41; G01N 33/0004–0075
See application file for complete search history.

(56) References Cited

U.S. PATENT DOCUMENTS 9,000,758 B2 4/2015 Iwahashi
2009/0255812 A1* 10/2009 Yoshida ............ G01N 27/4077 204/431

(Continued)

FOREIGN PATENT DOCUMENTS

CN 108693232 10/2018
DE 10 2012 219 555 A1 5/2013

(Continued)

OTHER PUBLICATIONS

Sakakibara et al., English translation of JP-2015194479-A, 2015.*

(Continued)

*Primary Examiner* — James Lin
*Assistant Examiner* — Sommer Yousef Osman
(74) *Attorney, Agent, or Firm* — MATTINGLY & MALUR, PC

(57) ABSTRACT

A sensor element includes a porous leading-end protective layer disposed around an outer periphery of an element base in a predetermined range from an end portion on a side where a sensing part is disposed, the protective layer includes: a first layer disposed on two main surfaces of the element base; a second layer disposed to cover the end portion and four side surfaces of the element base including the two main surfaces on which the first layer is disposed; and a layer disposed to cover the second layer, the second layer has a porosity of 30% to 70% and a thickness of 6 to 30 times a thickness of the first layer, and the third layer has a porosity of 10% to 40% and a thickness of 2 to 15 times the thickness of the first layer.

4 Claims, 4 Drawing Sheets

(56) References Cited

U.S. PATENT DOCUMENTS

| | | | | |
|---|---|---|---|---|
| 2012/0211362 | A1* | 8/2012 | Onkawa | G01N 27/4077 204/424 |
| 2013/0104625 | A1 | 5/2013 | Otsuka et al. | |
| 2017/0284958 | A1 | 10/2017 | Watanabe et al. | |
| 2018/0011051 | A1* | 1/2018 | Okamoto | G01N 27/4074 |
| 2018/0017514 | A1* | 1/2018 | Kato | G01N 33/497 |
| 2018/0284055 | A1 | 10/2018 | Hino | |
| 2020/0041438 | A1 | 2/2020 | Watanabe et al. | |
| 2020/0072784 | A1 | 3/2020 | Watanabe et al. | |

FOREIGN PATENT DOCUMENTS

| | | | | |
|---|---|---|---|---|
| DE | 10 2014 222 379 | A1 | 5/2016 | |
| JP | 2007-132954 | A | 5/2007 | |
| JP | 2009080099 | A * | 4/2009 | G01N 27/4071 |
| JP | 2012-189579 | A | 10/2012 | |
| JP | 5344375 | B2 | 11/2013 | |
| JP | 5344675 | | 11/2013 | |
| JP | 2015194479 | A * | 11/2015 | |
| JP | 2017187482 | A * | 10/2017 | G01N 27/4074 |
| JP | 2018-169324 | A | 11/2018 | |
| JP | 2020-020738 | A | 2/2020 | |
| JP | 2020-034443 | A | 3/2020 | |

OTHER PUBLICATIONS

Iwai et al., English translation of JP-2017187482-A, 2017.*

Toguchi et al., English Translation of JP2009080099A, 2009 (Year: 2009).*

Unexamined U.S. Appl. No. 17/460,752, filed Aug. 30, 2021.

Unexamined U.S. Appl. No. 17/460,763, filed Aug. 30, 2021.

Unexamined U.S. Appl. No. 17/460,780, filed Aug. 30, 2021.

International Search Report of PCT/JP2020/009578 dated Jun. 2, 2020.

Chinese Office Action received in corresponding Chinese Application No. 202080017350.2 dated Dec. 29, 2023.

German Office Action received in corresponding German Application No. 11 2020 001 614.5 dated Dec. 16, 2025.

* cited by examiner

SENSOR ELEMENT OF GAS SENSOR

CROSS-REFERENCE TO RELATED APPLICATION

This application is a continuation application of PCT/JP2020/009578, filed on Mar. 6, 2020, which claims the benefit of priority of Japanese Patent Application No. 2019-067010, filed on Mar. 29, 2019, the entire contents of which are incorporated herein by reference.

BACKGROUND OF THE INVENTION

Field of the Invention

The present invention relates to a sensor element of a gas sensor and, in particular, to a surface protective layer thereof.

Description of the Background Art

As a gas sensor for determining concentration of a desired gas component contained in a measurement gas, such as an exhaust gas from an internal combustion engine, a gas sensor that includes a sensor element made of an oxygen-ion conductive solid electrolyte, such as zirconia (ZrO2), and including some electrodes on the surface and the inside thereof has been widely known. As the sensor element, a sensor element having an elongated planar shape and including a protective layer formed of a porous body (porous protective layer) in an end portion in which a part for introducing the measurement gas is provided has been known (see Japanese Patent No. 5344675, for example).

The protective layer is provided to the surface of the sensor element to secure water resistance of the sensor element when the gas sensor is in use. Specifically, the protective layer is provided to prevent water-induced cracking of the sensor element under the action of thermal shock caused by heat (cold) from water droplets adhering to the surface of the sensor element.

When such a protective layer is provided to improve thermal shock resistance, however, heat capacity of the sensor element as a whole increases, and force of constraint on the sensor element increases. This leads to poor rapid heat-up performance of the sensor element. Depending on the environment of use of the gas sensor, the protective film can be detached from the sensor element due to a vibration caused in the environment, so that it is necessary to secure adhesion of the protective layer.

SUMMARY

The present invention relates to a sensor element of a gas sensor and, in particular, to a surface protective layer thereof.

According to the present invention, a sensor element of a gas sensor includes: an element base being a ceramic structure including a sensing part to sense a gas component to be measured; and a leading-end protective layer being a porous layer disposed around an outer periphery of the element base in a predetermined range from an end portion on a side where the sensing part is disposed. The leading-end protective layer includes: a first leading-end protective layer disposed on two main surfaces of the element base; a second leading-end protective layer disposed to cover the end portion and four side surfaces of the element base including the two main surfaces on which the first leading-end protective layer is disposed; and a third leading-end protective layer disposed to cover the second leading-end protective layer, and having a lower porosity than the second leading-end protective layer, the second leading-end protective layer has a porosity of 30% to 70% and a thickness of 6 to 30 times a thickness of the first leading-end protective layer, and the third leading-end protective layer has a porosity of 10% to 40% and a thickness of 2 to 15 times the thickness of the first leading-end protective layer.

According to the present invention, the sensor element of the gas sensor having both excellent water resistance and heat-up performance is achieved.

It is therefore an object of the invention to provide a sensor element of a gas sensor having both excellent water resistance and rapid heat-up performance.

DESCRIPTION OF THE PREFERRED EMBODIMENTS

<Overview of Sensor Element and Gas Sensor>

Figure 1:
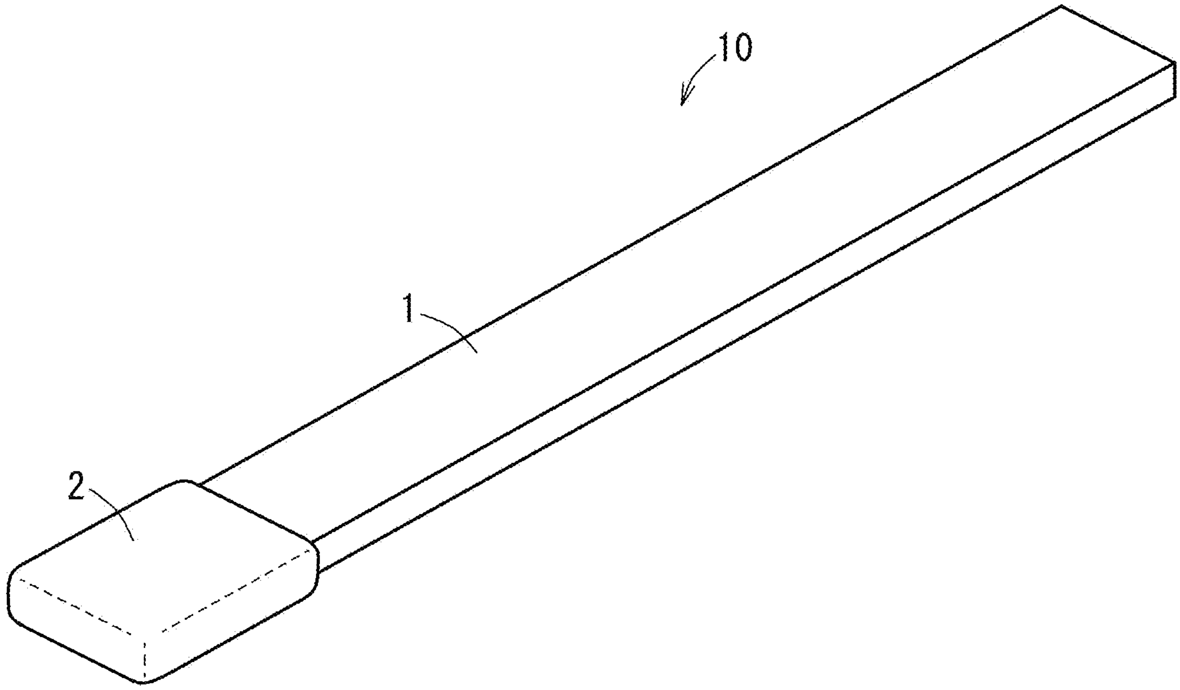
FIG. 1 is a schematic external perspective view of a sensor element 10.
Figure 2:
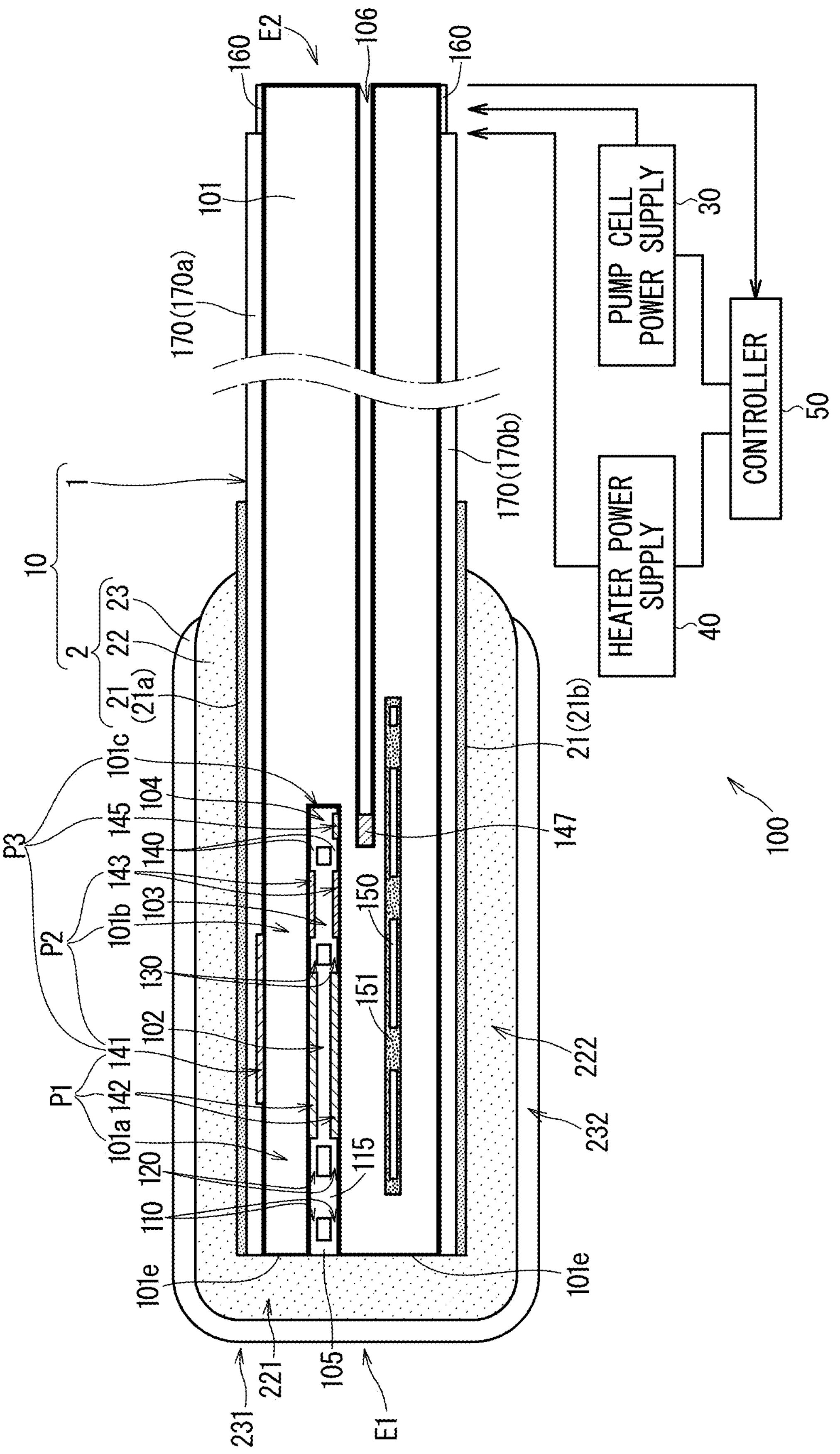
FIG. 2 is a schematic view illustrating a configuration of a gas sensor 100 including a sectional view taken along a longitudinal direction of the sensor element 10.

FIG. 1 is a schematic external perspective view of a sensor element (gas sensor element) 10 according to an embodiment of the present invention. FIG. 2 is a schematic view illustrating a configuration of a gas sensor 100 including a sectional view taken along a longitudinal direction of the sensor element 10. The sensor element 10 is a ceramic structure as a main component of the gas sensor 100 sensing a predetermined gas component in a measurement gas, and measuring concentration thereof. The sensor element 10 is a so-called limiting current gas sensor element.

In addition to the sensor element 10, the gas sensor 100 mainly includes a pump cell power supply 30, a heater power supply 40, and a controller 50.

As illustrated in FIG. 1, the sensor element 10 has a configuration in which one end portion of an elongated planar element base 1 is covered with a porous leading-end protective layer 2. The leading-end protective layer 2 includes three layers: a first leading-end protective layer 21, a second leading-end protective layer 22, and a third leading-end protective layer 23. Details of the leading-end protective layer 2 will be described later.

As illustrated in FIG. 2, the element base 1 includes an elongated planar ceramic body 101 as a main structure, main surface protective layers 170 are provided on two main surfaces of the ceramic body 101, and, in the sensor element 10, the leading-end protective layer 2 is further provided outside both an end surface (a leading end surface 101*e* of the ceramic body 101) and four side surfaces in one leading end portion. The four side surfaces other than opposite end surfaces in the longitudinal direction of the sensor element 10 (or the element base 1, or the ceramic body 101) are hereinafter simply referred to as side surfaces of the sensor element 10 (or the element base 1, or the ceramic body 101).

The ceramic body 101 is made of ceramic containing, as a main component, zirconia (yttrium stabilized zirconia), which is an oxygen-ion conductive solid electrolyte. Various components of the sensor element 10 are provided outside and inside the ceramic body 101. The ceramic body 101 having the configuration is dense and airtight. The configuration of the sensor element 10 illustrated in FIG. 2 is just an example, and a specific configuration of the sensor element 10 is not limited to this configuration.

The sensor element 10 illustrated in FIG. 2 is a so-called serial three-chamber structure type gas sensor element including a first internal chamber 102, a second internal chamber 103, and a third internal chamber 104 inside the ceramic body 101. That is to say, in the sensor element 10, the first internal chamber 102 communicates, through a first diffusion control part 110 and a second diffusion control part 120, with a gas inlet 105 opening to the outside on a side of one end portion E1 of the ceramic body 101 (to be precise, communicating with the outside through the leading-end protective layer 2), the second internal chamber 103 communicates with the first internal chamber 102 through a third diffusion control part 130, and the third internal chamber 104 communicates with the second internal chamber 103 through a fourth diffusion control part 140. A path from the gas inlet 105 to the third internal chamber 104 is also referred to as a gas distribution part. In the sensor element 10 according to the present embodiment, the gas distribution part is provided straight along the longitudinal direction of the ceramic body 101.

The first diffusion control part 110, the second diffusion control part 120, the third diffusion control part 130, and the fourth diffusion control part 140 are each provided as two slits vertically arranged in FIG. 2. The first diffusion control part 110, the second diffusion control part 120, the third diffusion control part 130, and the fourth diffusion control part 140 provide predetermined diffusion resistance to a measurement gas passing therethrough. A buffer space 115 having an effect of buffering pulsation of the measurement gas is provided between the first diffusion control part 110 and the second diffusion control part 120.

An outer pump electrode 141 is provided on an outer surface of the ceramic body 101, and an inner pump electrode 142 is provided in the first internal chamber 102. Furthermore, an auxiliary pump electrode 143 is provided in the second internal chamber 103, and a measurement electrode 145 as a sensing part to directly sense a gas component to be measured is provided in the third internal chamber 104. In addition, a reference gas inlet 106 which communicates with the outside and through which a reference gas is introduced is provided on a side of the other end portion E2 of the ceramic body 101, and a reference electrode 147 is provided in the reference gas inlet 106.

In a case where a target of measurement of the sensor element 10 is NOx in the measurement gas, for example, concentration of a NOx gas in the measurement gas is calculated by a process as described below.

First, the measurement gas introduced into the first internal chamber 102 is adjusted to have a substantially constant oxygen concentration by a pumping action (pumping in or out of oxygen) of a main pump cell P1, and then introduced into the second internal chamber 103. The main pump cell P1 is an electrochemical pump cell including the outer pump electrode 141, the inner pump electrode 142, and a ceramic layer 101*a* that is a portion of the ceramic body 101 existing between these electrodes. In the second internal chamber 103, oxygen in the measurement gas is pumped out of the element by a pumping action of an auxiliary pump cell P2, which is also an electrochemical pump cell, so that the measurement gas is at a sufficiently low oxygen partial pressure. The auxiliary pump cell P2 includes the outer pump electrode 141, the auxiliary pump electrode 143, and a ceramic layer 101*b* that is a portion of the ceramic body 101 existing between these electrodes.

The outer pump electrode 141, the inner pump electrode 142, and the auxiliary pump electrode 143 are each formed as a porous cermet electrode (e.g., a cermet electrode made of $ZrO_2$ and Pt that contains Au of 1%). The inner pump electrode 142 and the auxiliary pump electrode 143 to be in contact with the measurement gas are each formed using a material having weakened or no reducing ability with respect to a NOx component in the measurement gas.

NOx in the measurement gas caused by the auxiliary pump cell P2 to be at a low oxygen partial pressure is introduced into the third internal chamber 104, and reduced or decomposed by the measurement electrode 145 provided in the third internal chamber 104. The measurement electrode 145 is a porous cermet electrode also functioning as a NOx reduction catalyst that reduces NOx existing in an atmosphere in the third internal chamber 104. During the reduction or decomposition, a potential difference between the measurement electrode 145 and the reference electrode 147 is maintained constant. Oxygen ions generated by the above-mentioned reduction or decomposition are pumped out of the element by a measurement pump cell P3. The measurement pump cell P3 includes the outer pump electrode 141, the measurement electrode 145, and a ceramic layer 101*c* that is a portion of the ceramic body 101 existing between these electrodes. The measurement pump cell P3 is an electrochemical pump cell pumping out oxygen generated by decomposition of NOx in an atmosphere around the measurement electrode 145.

Pumping (pumping in or out of oxygen) of the main pump cell P1, the auxiliary pump cell P2, and the measurement pump cell P3 is achieved, under control performed by the controller 50, by the pump cell power supply (variable power supply) 30 applying a voltage necessary for pumping across electrodes included in each of the pump cells. In a case of the measurement pump cell P3, a voltage is applied across the outer pump electrode 141 and the measurement electrode 145 so that the potential difference between the measurement electrode 145 and the reference electrode 147 is maintained at a predetermined value. The pump cell power supply 30 is typically provided for each pump cell.

The controller 50 detects a pump current Ip2 flowing between the measurement electrode 145 and the outer pump electrode 141 in accordance with the amount of oxygen pumped out by the measurement pump cell P3, and calculates a NOx concentration in the measurement gas based on a linear relationship between a current value (NOx signal) of the pump current Ip2 and the concentration of decomposed NOx.

The gas sensor 100 preferably includes a plurality of electrochemical sensor cells, which are not illustrated, sensing the potential difference between each pump electrode and the reference electrode 147, and each pump cell is controlled by the controller 50 based on a signal detected by each sensor cell.

In the sensor element 10, a heater 150 is buried in the ceramic body 101. The heater 150 is provided, below the gas distribution part in FIG. 2, over a range from the vicinity of the one end portion E1 at least to a location of formation of the measurement electrode 145 and the reference electrode 147. The heater 150 is provided mainly to heat the sensor element 10 to enhance oxygen-ion conductivity of the solid electrolyte forming the ceramic body 101 when the sensor element 10 is in use. More particularly, the heater 150 is provided to be surrounded by an insulating layer 151.

The heater 150 is a resistance heating body made, for example, of platinum. The heater 150 generates heat by being powered from the heater power supply 40 under control performed by the controller 50.

The sensor element 10 according to the present embodiment is heated by the heater 150 when being in use so that the temperature at least in a range from the first internal chamber 102 to the second internal chamber 103 is at or above 500° C. In some cases, the sensor element 10 is heated so that the temperature of the gas distribution part as a whole from the gas inlet 105 to the third internal chamber 104 is at or above 500° C. These are to enhance the oxygen-ion conductivity of the solid electrolyte forming each pump cell and to desirably demonstrate the ability of each pump cell. In this case, the temperature in the vicinity of the first internal chamber 102, which is at the highest temperature, is approximately at 700° C. to 800° C. A set heating temperature of the heater 150 when the sensor element 10 is driven is also referred to as an element driving temperature.

In the following description, from among the two main surfaces of the ceramic body 101, a main surface (or an outer surface of the sensor element 10 having the main surface) which is located on an upper side in FIG. 2 and on a side where the main pump cell P1, the auxiliary pump cell P2, and the measurement pump cell P3 are mainly provided is also referred to as a pump surface, and a main surface (or an outer surface of the sensor element 10 having the main surface) which is located on a lower side in FIG. 2 and on a side where the heater 150 is provided is also referred to as a heater surface. In other words, the pump surface is a main surface closer to the gas inlet 105, the three internal chambers, and the pump cells than to the heater 150, and the heater surface is a main surface closer to the heater 150 than to the gas inlet 105, the three internal chambers, and the pump cells.

A plurality of electrode terminals 160 are formed on the respective main surfaces of the ceramic body 101 on the side of the other end portion E2 to establish electrical connection between the sensor element 10 and the outside. These electrode terminals 160 are electrically connected to the above-mentioned five electrodes, opposite ends of the heater 150, and a lead for detecting heater resistance, which is not illustrated, through leads provided inside the ceramic body 101, which are not illustrated, to have a predetermined correspondence relationship. Application of a voltage from the pump cell power supply 30 to each pump cell of the sensor element 10 and heating by the heater 150 by being powered from the heater power supply 40 are thus performed through the electrode terminals 160.

The sensor element 10 further includes the above-mentioned main surface protective layers 170 (170*a* and 170*b*) on the pump surface and the heater surface of the ceramic body 101. The main surface protective layers 170 are layers made of alumina, having a thickness of approximately 5 μm to 30 μm, and including pores with a porosity of approximately 20% to 40%, and are provided to prevent adherence of any foreign matter and poisoning substances to the main surfaces (the pump surface and the heater surface) of the ceramic body 101 and the outer pump electrode 141 provided on the pump surface. The main surface protective layer 170*a* on the pump surface thus functions as a pump electrode protective layer for protecting the outer pump electrode 141.

In the present embodiment, the porosity is obtained by applying a known image processing method (e.g., binarization processing) to a scanning electron microscope (SEM) image of an evaluation target.

The main surface protective layers 170 are provided over substantially all of the pump surface and the heater surface except that the electrode terminals 160 are partially exposed in FIG. 2, but this is just an example. The main surface protective layers 170 may locally be provided in the vicinity of the outer pump electrode 141 on the side of the one end portion E1 compared with the case illustrated in FIG. 2.

<Details of Leading-End Protective Layer>

In the sensor element 10, the leading-end protective layer 2 is provided around an outermost periphery of the element base 1 having a configuration as described above in a predetermined range from the one end portion E1.

The leading-end protective layer 2 is provided in a manner of surrounding a portion of the element base 1 in which the temperature is high (up to approximately 700° C. to 800° C.) when the gas sensor 100 is in use, in order to secure water resistance in the portion to thereby suppress the occurrence of cracking (water-induced cracking) of the element base 1 due to thermal shock caused by local temperature reduction upon direct exposure of the portion to water.

In addition, the leading-end protective layer 2 is provided to secure poisoning resistance to prevent poisoning substances, such as Mg, from entering into the sensor element 10.

On the other hand, providing the leading-end protective layer 2 is, in general, not necessarily advisable in terms of rapid heat-up performance as it increases heat capacity of the sensor element 10, and increases force of constraint on the element base 1. In the present embodiment, a configuration of the leading-end protective layer 2 is determined in light of securement of rapid heat-up performance.

Specifically, in the sensor element 10 according to the present embodiment, the leading-end protective layer 2 includes the three layers: the first leading-end protective layer 21, the second leading-end protective layer 22, and the third leading-end protective layer 23 as illustrated in FIG. 2.

The first leading-end protective layer 21 is an underlying layer provided to secure bonding (adhesion) of the second leading-end protective layer 22 formed thereon (further the third leading-end protective layer 23) to the element base 1. The first leading-end protective layer 21 is provided at least on two main surfaces of the element base 1 on a side of the pump surface and a side of the heater surface. That is to say, the first leading-end protective layer 21 includes a first leading-end protective layer 21*a* on the side of the pump surface and a first leading-end protective layer 21*b* on the side of the heater surface.

The first leading-end protective layer 21, however, is not provided on the leading end surface 101*e* and side surfaces of the ceramic body 101 (of the element base 1). This is to reduce the force of constraint on the element base 1 so as not to impair rapid heat-up performance while securing adhesion.

The first leading-end protective layer 21 is made of alumina, has a porosity of 30% to 50%, and has a thickness of 30 μm to 50 μm. In contrast to the second leading-end protective layer 22 and the third leading-end protective layer 23, the first leading-end protective layer 21 is formed along with the element base 1 in a process of manufacturing the element base 1 as described below.

The second leading-end protective layer 22 and the third leading-end protective layer 23 are provided in this order from inside to cover the leading end surface 101_e_ and the four side surfaces on the side of the one leading end portion E1 of the element base 1 (around an outer periphery of the element base 1 on the side of the one leading end portion E1). A portion of the second leading-end protective layer 22 on the side of the leading end surface 101_e_ is particularly referred to as a leading-end portion 221, and a portion of the second leading-end protective layer 22 on the side of the pump surface and the side of the heater surface is particularly referred to as a main surface portion 222. Similarly, a portion of the third leading-end protective layer 23 on the side of the leading end surface 101_e_ is particularly referred to as a leading-end portion 231, and a portion of the third leading-end protective layer 23 on the side of the pump surface and the side of the heater surface is particularly referred to as a main surface portion 232.

The second leading-end protective layer 22 is made of alumina, has a porosity of 30% to 70%, and has a thickness of 6 to 30 times the thickness of the first leading-end protective layer 21. The second leading-end protective layer 22 preferably has a porosity of 50% to 70%. The third leading-end protective layer 23 is made of alumina, has a thickness of 2 to 15 times the thickness of the first leading-end protective layer 21, and has a value of porosity of 10% to 40% to have a value of porosity lower than that of the second leading-end protective layer 22. The leading-end protective layer 2 thereby has a configuration in which the second leading-end protective layer 22 having the lowest thermal conductivity of the three layers is covered with the third leading-end protective layer 23 provided as an outermost layer to have a lower porosity than the second leading-end protective layer 22.

In other words, the second leading-end protective layer 22 is provided as a layer having low thermal conductivity to have a function (a thermal insulating effect) to suppress heat conduction from the outside to the element base 1, and the third leading-end protective layer 23 has a function to maintain overall strength and a function to suppress ingress of water. The leading-end protective layer 2 has this configuration so that, even if water adheres to the surface (the surface of the third leading-end protective layer 23) when the sensor element 10 at a high temperature is in use, ingress of water is suppressed, and cold caused by rapid cooling associated with adherence is less likely to be transferred to the element base 1. That is to say, the leading-end protective layer 2 has excellent thermal shock resistance. As a result, the sensor element 10 is less likely to cause water-induced cracking, and has excellent water resistance.

In addition, the sensor element 10 according to the present embodiment is provided so that the second leading-end protective layer 22 and the third leading-end protective layer 23 have thicknesses and porosities in the above-mentioned ranges to secure heat-up performance (rapid heat-up performance) at driving. That is to say, the sensor element 10 according to the present embodiment has two opposing features of having thermal shock resistance (water resistance) and securing heat-up performance. In the present embodiment, heat-up performance of the sensor element 10 can be evaluated by a time from the start of heating of the sensor element 10 as a whole including the leading-end protective layer 2 using the heater 150 provided inside the sensor element 10 to start use of the gas sensor 100 until the temperature of the sensor element 10 reaches a predetermined temperature (e.g., a time until the temperature of the heater 150 reaches the element driving temperature).

However, an excessive increase in thickness of each of the second leading-end protective layer 22 and the third leading-end protective layer 23 is not preferable because it increases a thermal load put on the heater 150 at heating up, and, as a result, cracking of the sensor element 10 may occur. From this viewpoint, the second leading-end protective layer 22 preferably has a thickness of 800 μm or less, and the third leading-end protective layer 23 preferably has a thickness of 400 μm or less.

The second leading-end protective layer 22 and the third leading-end protective layer 23 are formed by sequentially thermal spraying (plasma-spraying) materials for them with respect to the element base 1 having a surface on which the first leading-end protective layer 21 has been formed. This is to develop an anchoring effect between the second leading-end protective layer 22 and the first leading-end protective layer 21 formed in advance in the process of manufacturing the element base 1 to thereby secure bonding (adhesion) of the second leading-end protective layer 22 (including the third leading-end protective layer 23 formed outside the second leading-end protective layer 22) to the first leading-end protective layer 21. In other words, the first leading-end protective layer 21 has a function to secure bonding (adhesion) of the second leading-end protective layer 22. Bonding (adhesion) secured in this manner suitably suppresses separation of the leading-end protective layer 2 from the element base 1 caused by thermal shock due to adherence of water droplets.

In FIG. 2, the second leading-end protective layer 22 is provided not to cover the first leading-end protective layer 21 (21_a_ and 21_b_) as a whole but to expose an end portion of the first leading-end protective layer 21 on a side opposite the side of the one end portion E1 in the longitudinal direction of the sensor element 10. This is to more surely secure bonding (adhesion) of the second leading-end protective layer 22 (including the third leading-end protective layer 23 formed outside the second leading-end protective layer 22) to the first leading-end protective layer 21.

As described above, in the sensor element 10 according to the present embodiment, the leading-end protective layer 2 to surround the portion of the element base 1 in which the temperature is high when the gas sensor 100 is in use has a three-layer structure including the first leading-end protective layer 21, the second leading-end protective layer 22, and the third leading-end protective layer 23, and these layers are provided to have predetermined porosities and thicknesses, so that the first leading-end protective layer 21 has the function to secure bonding (adhesion) of the second leading-end protective layer 22, the second leading-end protective layer 22 has the function to suppress heat conduction from the outside to the element base 1, and the third leading-end protective layer 23 has the function to maintain overall strength and the function to suppress ingress of water. The sensor element 10 thus secures both thermal shock resistance and heat-up performance while securing adhesion of the leading-end protective layer. That is to say, the sensor element 10 has both excellent water resistance and heat-up performance.

<Process of Manufacturing Sensor Element>

Figure 3:
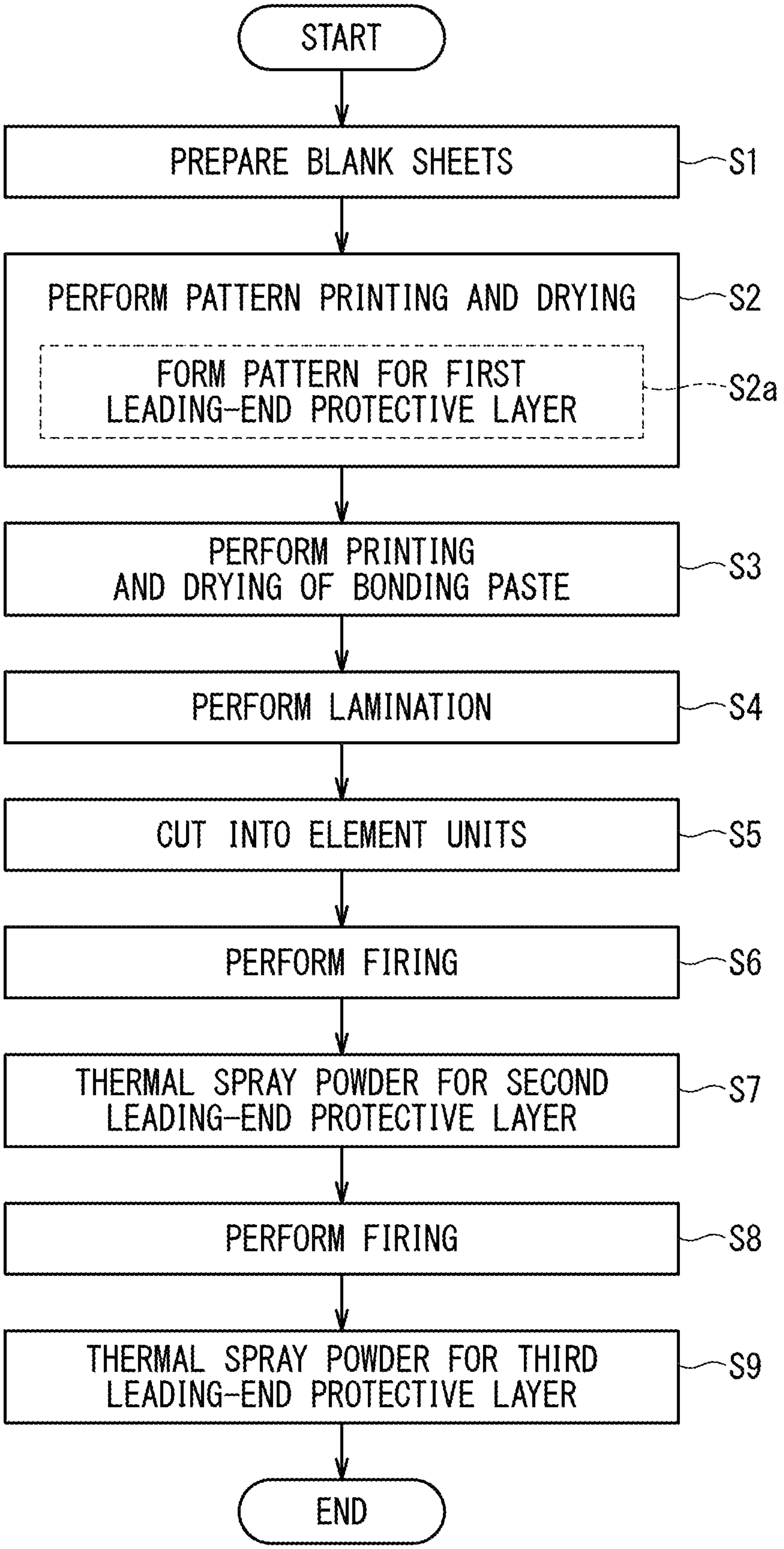
FIG. 3 is a flowchart of processing at the manufacture of the sensor element 10.

One example of a process of manufacturing the sensor element 10 having a configuration and features as described above will be described next. FIG. 3 is a flowchart of processing at the manufacture of the sensor element 10.

At the manufacture of the element base 1, a plurality of blank sheets (not illustrated) being green sheets containing the oxygen-ion conductive solid electrolyte, such as zirconia, as a ceramic component and having no pattern formed thereon are prepared first (step S1).

The blank sheets have a plurality of sheet holes used for positioning in printing and lamination. The sheet holes are formed to the blank sheets in advance prior to pattern formation through, for example, punching by a punching machine. Green sheets corresponding to a portion of the ceramic body 101 in which an internal space is formed also include penetrating portions corresponding to the internal space formed in advance through, for example, punching as described above. The blank sheets are not required to have the same thickness, and may have different thicknesses in accordance with corresponding portions of the element base 1 eventually formed.

After preparation of the blank sheets corresponding to the respective layers, pattern printing and drying are performed on the individual blank sheets (step S2). Specifically, a pattern of various electrodes, a pattern of the heater 150 and the insulating layer 151, a pattern of the electrode terminals 160, a pattern of the main surface protective layers 170, a pattern of internal wiring, which is not illustrated, and the like are formed. Application or placement of a sublimable material (vanishing material) for forming the first diffusion control part 110, the second diffusion control part 120, the third diffusion control part 130, and the fourth diffusion control part 140 is also performed at the time of pattern printing. In addition, a pattern to form the first leading-end protective layer 21 (21*a* and 21*b*) is printed onto blank sheets to become an uppermost layer and a lowermost layer after lamination (step S2*a*).

The patterns are printed by applying pastes for pattern formation prepared in accordance with the properties required for respective formation targets onto the blank sheets using known screen printing technology. At formation of the first leading-end protective layer 21, for example, an alumina paste that can form the first leading-end protective layer 21 having a desired porosity and thickness in the sensor element 10 eventually obtained is used. A known drying means can be used for drying after printing.

After pattern printing on each of the blank sheets, printing and drying of a bonding paste are performed to laminate and bond the green sheets (step S3). The known screen printing technology can be used for printing of the bonding paste, and the known drying means can be used for drying after printing.

The green sheets to which an adhesive has been applied are then stacked in a predetermined order, and the stacked green sheets are crimped under predetermined temperature and pressure conditions to thereby form a laminated body (step S4). Specifically, crimping is performed by stacking and holding the green sheets as a target of lamination on a predetermined lamination jig, which is not illustrated, while positioning the green sheets at the sheet holes, and then heating and pressurizing the green sheets together with the lamination jig using a lamination machine, such as a known hydraulic pressing machine. The pressure, temperature, and time for heating and pressurizing depend on a lamination machine to be used, and these conditions may be determined appropriately to achieve good lamination. The pattern to form the first leading-end protective layer 21 may be formed on the laminated body obtained in this manner.

After the laminated body is obtained as described above, the laminated body is cut out at a plurality of positions to obtain unit bodies eventually becoming the individual element bases 1 (step S5).

The unit bodies as obtained are then each fired at a firing temperature of approximately 1300° C. to 1500° C. (step S6). The element base 1 having main surfaces on which the first leading-end protective layer 21 is provided is thereby manufactured. That is to say, the element base 1 is generated by integrally firing the ceramic body 101 made of the solid electrolyte, the electrodes, and the main surface protective layers 170 along with the first leading-end protective layer 21. Integral firing is performed in this manner, so that the electrodes each have sufficient adhesion strength in the element base 1.

After the element base 1 is manufactured in the above-mentioned manner, the second leading-end protective layer 22 and the third leading-end protective layer 23 are formed with respect to the element base 1. The second leading-end protective layer 22 is formed by thermal spraying powder (alumina powder) for forming the second leading-end protective layer prepared in advance at a position of the element base 1 as a target of formation of the second leading-end protective layer 22 to have an intended thickness (step S7), and then firing the element base 1 on which an applied film has been formed in the above manner (step S8). The alumina powder for forming the second leading-end protective layer contains alumina powder having predetermined particle size distribution and a pore-forming material at a ratio corresponding to a desired porosity, and the pore-forming material is pyrolyzed by firing the element base 1 after thermal spraying to suitably form the second leading-end protective layer 22 having a high porosity of 30% to 70%. Known technology is applicable to thermal spraying and firing.

Upon formation of the second leading-end protective layer 22, powder (alumina powder) for forming the third leading-end protective layer similarly prepared in advance and containing alumina powder having predetermined particle size distribution is thermal sprayed at a position of the element base 1 as a target of formation of the third leading-end protective layer 23 to have an intended thickness (step S9) to thereby form the third leading-end protective layer 23 having a desired porosity. The alumina powder for forming the third leading-end protective layer does not contain the pore-forming material. Known technology is also applicable to the thermal spraying.

The sensor element 10 is obtained by the above-mentioned procedures. The sensor element 10 thus obtained is housed in a predetermined housing, and built into the body (not illustrated) of the gas sensor 100.

<Modifications>

The above-mentioned embodiment is targeted at a sensor element having three internal chambers, but the sensor element is not necessarily required to have a three-chamber structure. That is to say, the sensor element may have one internal chamber or two internal chambers.

Figure 4:
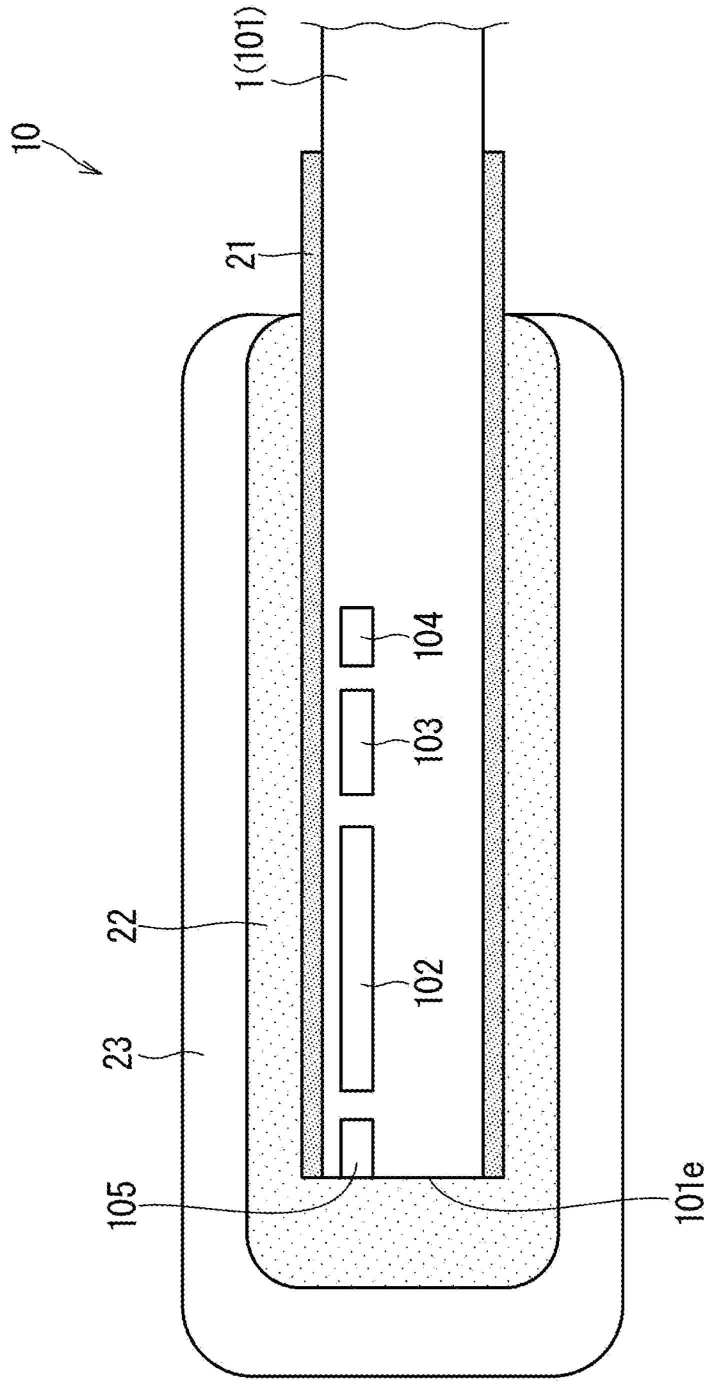
FIG. 4 is a schematic view illustrating a portion of the sensor element 10 differing in disposition of a third leading-end protective layer 23 from that illustrated in FIG. 2.

In FIG. 2, the third leading-end protective layer 23 of the sensor element 10 is formed to expose an end portion of the second leading-end protective layer 22 on a side opposite the side of the one end portion E1, but the third leading-end protective layer 23 is not necessarily required to be formed in this manner. FIG. 4 is a schematic view illustrating a portion of the sensor element 10 differing in disposition of the third leading-end protective layer 23 from that illustrated in FIG. 2. In FIG. 4, the third leading-end protective layer 23 is formed to cover the end portion of the second leading-end protective layer 22.

In the above-mentioned embodiment, after thermal spraying of the powder for forming the second leading-end protective layer in step S7, firing in step S8 is performed, and then thermal spraying of the powder for forming the third leading-end protective layer in step S9 is performed, but firing in step S8 and thermal spraying in step S9 may be performed in reverse order.

In the above-mentioned embodiment, the second leading-end protective layer 22 and the third leading-end protective layer 23 are each made of alumina, and the alumina powder is used as a thermal spraying material when these layers are formed, but the second leading-end protective layer 22 and the third leading-end protective layer 23 may not be made of alumina. The second leading-end protective layer 22 and the third leading-end protective layer 23 may be provided using a metal oxide, such as zirconia ($ZrO_2$), spinel ($MgAl_2O_4$), and mullite ($Al_6O_{13}Si_2$), in place of alumina. In this case, powder of these metal oxides may be used as the thermal spraying material.

Examples

Twelve types of sensor elements 10 (Samples Nos. 1 to 12) having different combinations of intended thicknesses (film thicknesses) of the first leading-end protective layer (hereinafter, first layer) 21, the second leading-end protective layer (hereinafter, second layer) 22, and the third leading-end protective layer (hereinafter, third layer) 23 and porosities of the second layer 22 and the third layers 23 were manufactured, and thermal shock resistance and heat-up performance of each of the sensor elements 10 and adhesion of the leading-end protective layer 2 (specifically, the second layer 22 and the third layer 23) were evaluated. The first layer 21, the second layer 22, and the third layer 23 were each made of alumina. The porosity of the first layer 21 was in a range of 30% to 50%.

For comparison, sensor elements 10 (Samples Nos. 13 and 14) each including the first layer 21 only on the pump surface (P surface) or the heater surface (H surface), a sensor element 10 (Sample No. 15) including the first layer 21 on the entire periphery of the element base 1, that is, not only on the pump surface and the heater surface but also on the leading end surface 101*e* and the side surfaces of the element base 1, and a sensor element (Sample No. 16) not including the first layer 21 were manufactured on the same conditions as those for the sensor element in No. 2 except for the first layer 21, and similar evaluation to that performed on Samples Nos. 1 to 12 was performed. The sensor elements 10 in Nos. 13 and 14 were intended to separately perform evaluation on the side of the pump surface and evaluation on the side of the heater surface of the sensor element 10 in No. 2.

Thermal shock resistance was evaluated by applying a water droplet of 0.1 μL at a time to the side of the pump surface of each of the sensor elements 10 while measuring the pump current through the main pump cell P1 with the sensor element 10 heated by the heater 150 to approximately 500° C. to 900° C., and specifying a maximum amount of water causing no abnormalities in an output of measurement. In the sensor elements in Nos. 13 and 14, however, evaluation was performed only on a surface on a side where the first layer 21 is provided.

It is considered that any abnormality occurs in the output of measurement in a thermal shock resistance test because the leading-end protective layer 2 is subjected to thermal shock to cause cracking of the sensor element 10.

Heat-up performance was evaluated by a time (heat-up time) from the start of driving of the sensor element 10 at a room temperature until the temperature of the sensor element 10 reaches 850° C. envisioned as the element driving temperature. The temperature of the sensor element 10 was calculated from a value of resistance inside the element.

Adhesion of the leading-end protective layer 2 was evaluated by the magnitude of force required to displace the element base 1 when only the element base 1 was pulled in the longitudinal direction with the leading-end protective layer 2 fixed.

Film thicknesses of the first layer 21, the second layer 22, and the third layer 23, ratios of the film thickness of the second layer 22 and the film thickness of the third layer 23 to the film thickness of the first layer 21, a surface of the element base 1 on which the first layer 21 is formed, porosities of the second layer 22 and the third layer 23, and results of evaluation of thermal shock resistance, heat-up performance, and adhesion are shown in Table 1 as a list.

TABLE 1

| | FIRST LAYER | | SECOND LAYER | | THIRD LAYER | | | | |
|---|---|---|---|---|---|---|---|---|---|
| No. | FILM THICKNESS [μm] FILM THICKNESS RATIO | FORMATION SURFACE | FILM THICKNESS [μm] FILM THICKNESS RATIO | POROSITY [%] | FILM THICKNESS [μm] FILM THICKNESS RATIO | POROSITY [%] | THERMAL SHOCK RESISTANCE | HEAT-UP PERFORMANCE | ADHESION |
| 1 | 40 | P/H | 600 | 50 | 300 | 30 | ○ | ○ | ○ |
| | 1 | SURFACES | 15 | | 8 | | | | |
| 2 | 40 | P/H | 600 | 50 | 200 | 30 | ○ | ○ | ○ |
| | 1 | SURFACES | 15 | | 5 | | | | |
| 3 | 40 | P/H | 600 | 40 | 200 | 30 | Δ | ○ | ○ |
| | 1 | SURFACES | 15 | | 5 | | | | |
| 4 | 40 | P/H | 600 | 30 | 200 | 30 | Δ | ○ | ○ |
| | 1 | SURFACES | 15 | | 5 | | | | |
| 5 | 40 | P/H | 600 | 60 | 200 | 30 | ○ | ○ | ○ |
| | 1 | SURFACES | 15 | | 5 | | | | |
| 6 | 40 | P/H | 600 | 70 | 200 | 30 | ○ | ○ | ○ |
| | 1 | SURFACES | 15 | | 5 | | | | |
| 7 | 40 | P/H | 600 | 50 | 700 | 30 | ○ | x | ○ |
| | 1 | SURFACES | 15 | | 18 | | | | |
| 8 | 40 | P/H | 200 | 50 | 200 | 30 | x | ○ | ○ |
| | 1 | SURFACES | 5 | | 5 | | | | |
| 9 | 40 | P/H | 400 | 50 | 300 | 30 | ○ | ○ | ○ |
| | 1 | SURFACES | 10 | | 8 | | | | |
| 10 | 20 | P/H | 600 | 50 | 300 | 30 | ○ | ○ | Δ |
| | 1 | SURFACES | 30 | | 15 | | | | |
| 11 | 60 | P/H | 200 | 50 | 300 | 30 | x | Δ | ○ |

TABLE 1-continued

| No. | FIRST LAYER FILM THICKNESS [μm] FILM THICKNESS RATIO | FIRST LAYER FORMATION SURFACE | SECOND LAYER FILM THICKNESS [μm] FILM THICKNESS RATIO | SECOND LAYER POROSITY [%] | THIRD LAYER FILM THICKNESS [μm] FILM THICKNESS RATIO | THIRD LAYER POROSITY [%] | THERMAL SHOCK RESISTANCE | HEAT-UP PERFORMANCE | ADHESION |
|---|---|---|---|---|---|---|---|---|---|
| | 1 | SURFACES | 3.3 | | 5 | | | | |
| 12 | 60 | P/H | 600 | 50 | 100 | 30 | x | Δ | ○ |
| | 1 | SURFACES | 10 | | 1.7 | | | | |
| 13 | 40 | ONLY P | 600 | 50 | 200 | 30 | ○ | ○ | ○ |
| | 1 | SURFACE | 15 | | 5 | | | | |
| 14 | 40 | ONLY H | 600 | 50 | 200 | 30 | ○ | ○ | ○ |
| | 1 | SURFACE | 15 | | 5 | | | | |
| 15 | 40 | ALL | 600 | 50 | 200 | 30 | ○ | x | ○ |
| | 1 | SURFACES | 15 | | 5 | | | | |
| 16 | — | NOT | 600 | 50 | 200 | 30 | ○ | ○ | x |
| | — | PROVIDED | — | | — | | | | |

When the maximum amount of water causing no abnormalities in the output of measurement is 10 μL or more, thermal shock resistance is determined to be excellent, and a circle is marked in Table 1. When the maximum amount of water is 5 μL or more and less than 10 μL, thermal shock resistance is determined to be at a certain level, and a triangle is marked in Table 1. When the maximum amount of water is less than 5 μL, and a cross is marked in Table 1.

When the heat-up time is 30 seconds or less, heat-up performance is determined to be excellent, and a circle is marked in Table 1. When the heat-up time is more than 30 seconds and 50 seconds or less, heat-up performance is determined to be at a certain level, and a triangle is marked in Table 1. When the heat-up time is more than 50 seconds, and a cross is marked in Table 1.

When the magnitude of the force required to displace the element base 1 is 100 N or more, adhesion is determined to be excellent, and a circle is marked in Table 1. When the magnitude of the force is 50 N or more and less than 100 N, adhesion is determined to be at a certain level, and a triangle is marked in Table 1. When the magnitude of the force is less than 50 N, and a cross is marked in Table 1.

It is confirmed from the results shown in Table 1 that adhesion was secured except for the sensor element 10 in No. 16 not including the first layer 21.

The sensor element 10 in No. 15 including the first layer 21 on the entire periphery did not have sufficient heat-up performance, whereas the sensor elements 10 in Nos. 1 to 6 and Nos. 8 to 10 including the first layer 21 both on the pump surface and the heater surface as well as the sensor elements 10 in Nos. 13 and 14 including the first layer 21 only on one of the surfaces had excellent heat-up performance. The sensor elements 10 in Nos. 1, 2, 5, 6, 9, and 10 also had excellent thermal shock resistance. The sensor elements 10 in Nos. 3 and 4 had thermal shock resistance at the certain level.

The above-mentioned results show that, when the sensor element 10 includes the first layer 21 on the two main surfaces of the element base 1, the second layer 22 covering the end portion of the element base 1 and the four side surfaces of the element base 1 including the two main surfaces on which the first layer 21 is formed, and the third layer 23 covering the second layer 22, the second layer 22 has a porosity of 30% to 70% and a thickness of 6 to 30 times the thickness of the first layer 21, and the third layer 23 has a porosity of 10% to 40% and a thickness of 2 to 15 times the thickness of the first layer 21, the sensor element 10 having both excellent thermal shock resistance and heat-up performance while securing adhesion of the leading-end protective layer can be obtained.

The results also show that, especially when the second layer 22 has a porosity of 50% to 70%, the sensor element 10 having both excellent thermal shock resistance and heat-up performance can be obtained.

For confirmation, it can be said, only from the results shown in Table 1, that the sensor elements 10 in Nos. 13 and 14 each including the first layer 21 only on one of the side of the pump surface and the side of the heater surface have both excellent thermal shock resistance and heat-up performance. The first layer 21 is thus seemingly only required to be provided on only one of the side of the pump surface and the side of the heater surface. Evaluation of thermal shock resistance of each of the sensor elements 10 in Nos. 13 and 14, however, was performed only on the side of one of the main surfaces of the sensor element 10 where the first layer 21 is provided. On the other hand, water droplets may adhere to both of the main surfaces of the sensor element 10 in actual use of the gas sensor 100. The first layer 21 is thus preferably provided on both of the side of the pump surface and the side of the heater surface.

What is claimed is:

1. A sensor element of a gas sensor, the sensor element comprising:

an element base being a ceramic structure including a sensing part to sense a gas component to be measured;

a leading-end protective layer being a porous layer disposed around an outer periphery of said element base in a predetermined partial range from an end portion on a side where said sensing part is disposed, a main surface protective layer being a porous layer and being disposed around an outer periphery of said element base, wherein said main surface protective layer is inside said leading-end protective layer and said leading-end protective layer includes:

a first leading-end protective layer disposed on two main surfaces of said element base, wherein the first leading-end protective layer only covers a partial length of a whole length of said element base in a longitudinal direction of said element base;

a second leading-end protective layer disposed to cover said end portion and four side surfaces of said element base including said two main surfaces on which said first leading-end protective layer is disposed; and a third leading-end protective layer disposed to cover said second leading-end protective layer, and having a lower porosity than said second leading-end protective layer, said second leading-end protective layer has a porosity of 30% to 70% and a thickness of 6 to 30 times a thickness of said first leading-end protective layer, and said third leading-end protective layer has a porosity of 10% to 40% and a thickness of 2 to 15 times the thickness of said first leading-end protective layer.

2. The sensor element according to claim 1, wherein said second leading-end protective layer has a porosity of 50% to 70%.

3. The sensor element according to claim 2, wherein said first leading-end protective layer has a thickness of 30 μm to 50 μm.

4. The sensor element according to claim 1, wherein said first leading-end protective layer has a thickness of 30 μm to 50 μm.

* * * * *